United States Patent
Chandrasekaran et al.

(10) Patent No.: US 10,564,918 B2
(45) Date of Patent: Feb. 18, 2020

(54) TECHNIQUES OF REMOTELY PROVIDING USER INPUT TO THIN CLIENT

(71) Applicant: AMZETTA TECHNOLOGIES, LLC, Norcross, GA (US)

(72) Inventors: Balasubramanian Chandrasekaran, Chennai (IN); Manikandan Ganesan Malliga, Dindigul (IN); Yugender P. Subramanian, Redmond, WA (US); Varadachari Sudan Ayanam, Suwanee, GA (US)

(73) Assignee: AMZETTA TECHNOLOGIES, LLC, Norcross, GA (US)

(*) Notice: Subject to any disclaimer, the term of this patent is extended or adjusted under 35 U.S.C. 154(b) by 102 days.

(21) Appl. No.: 15/800,811

(22) Filed: Nov. 1, 2017

(65) Prior Publication Data

US 2019/0129680 A1 May 2, 2019

(51) Int. Cl.
*G06F 13/00* (2006.01)
*G06F 3/14* (2006.01)
*H04L 29/06* (2006.01)
*G06F 9/451* (2018.01)
*H04L 29/08* (2006.01)

(52) U.S. Cl.
CPC ............ *G06F 3/1454* (2013.01); *G06F 9/452* (2018.02); *H04L 67/42* (2013.01); *H04L 67/125* (2013.01)

(58) Field of Classification Search
CPC ....... G06F 3/1454; G06F 9/452; H04L 67/38; H04L 67/42; H04L 67/125
USPC ......... 709/217–219, 232, 248, 238, 204–206
See application file for complete search history.

(56) References Cited

U.S. PATENT DOCUMENTS

| | | | |
|---|---|---|---|
| 9,454,396 B2 * | 9/2016 | Ramasamy | G06F 9/45558 |
| 2016/0188356 A1 * | 6/2016 | Ramasamy | G06F 9/45558 718/1 |
| 2017/0235357 A1 * | 8/2017 | Leung | G06F 1/3212 713/310 |
| 2017/0372681 A1 * | 12/2017 | Imai | G09G 5/34 |
| 2019/0132215 A1 * | 5/2019 | Chandrasekaran | H04L 41/22 |

* cited by examiner

*Primary Examiner* — Kenneth R Coulter
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client redirects a screen display of the thin client to a remote device. The thin client also receives a message from the remote device, the message including an input-event data collection. The thin client generates an input event according to the input-event data collection. The thin client sends the input event to a control of the thin client through an input interface.

15 Claims, 8 Drawing Sheets

TECHNIQUES OF REMOTELY PROVIDING USER INPUT TO THIN CLIENT

BACKGROUND

Field

The present disclosure relates generally to networked computer systems, and more particularly, to techniques of providing user input events from a remote device to a thin client.

Background

The statements in this section merely provide background information related to the present disclosure and may not constitute prior art.

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client redirects a screen display of the thin client to a remote device. The thin client also receives a message from the remote device, the message including an input-event data collection. The thin client generates an input event according to the input-event data collection. The thin client sends the input event to a control of the thin client through an input interface.

DETAILED DESCRIPTION

Figure 1:
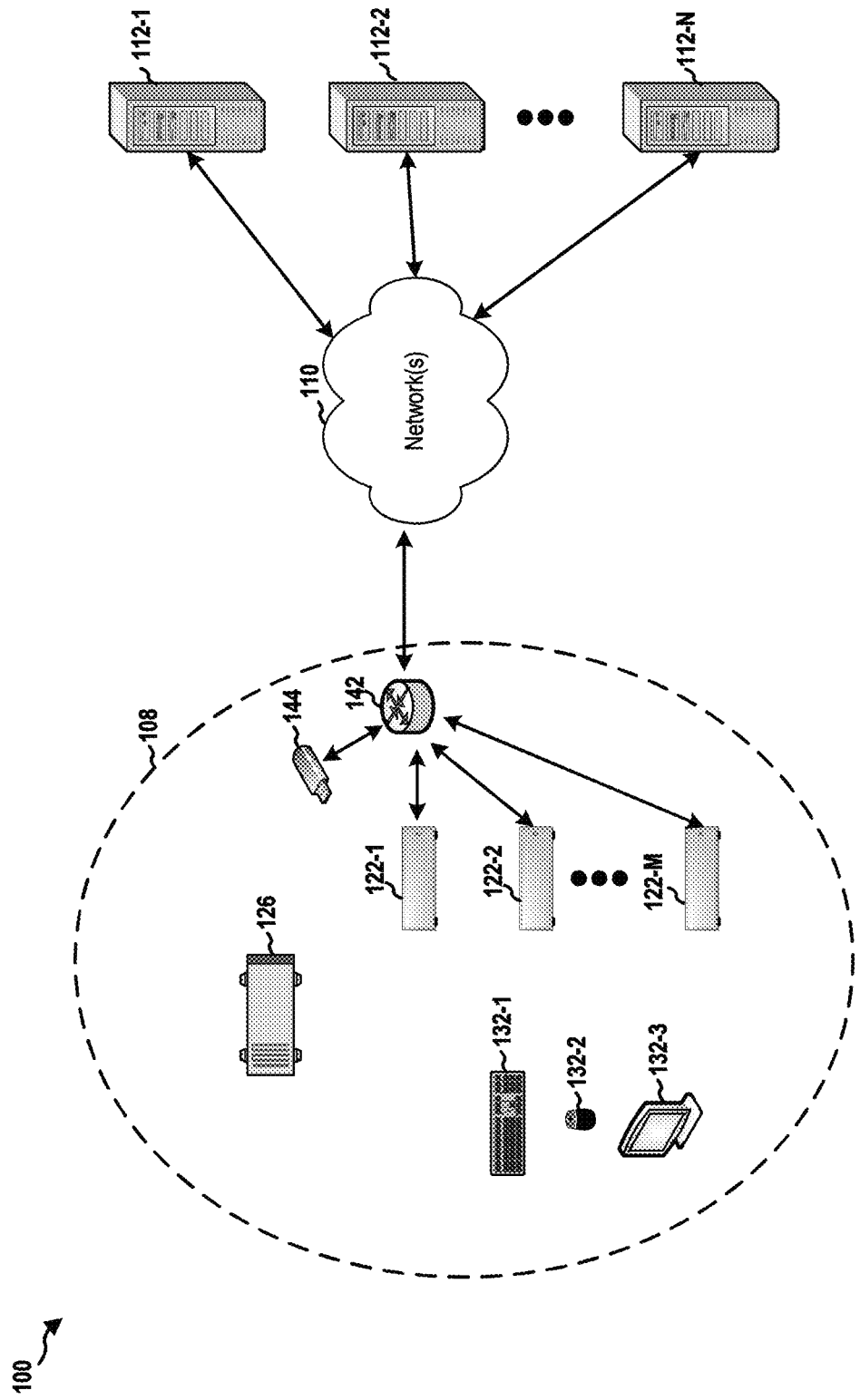
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating networked thin clients and remote machines. One or more of M thin clients 122-1, 122-2, ..., 122-M each may be utilized to establish a respective session with one or more of N remote machines 112-1, 112-2, ..., 112-N, M and N each being a respective integer greater than 0. In certain configurations, the thin clients 122-1, 122-2, ..., 122-M may be in communication with the remote machines 112-1, 112-2, ..., 112-N through a network 110 (e.g., Internet). Each of the remote machines 112-1, 112-2, ..., 112-N may be a virtual machine or a physical machine. Each of the thin clients 122-1, 122-2, ..., 122-M may be wirelessly connected with one or more peripherals, e.g., peripherals 132-1, 132-2, 132-3.

Further, a remote machine manager 126 may be utilized to manage the thin clients 122-1, 122-2, ..., 122-M, the remote machines 112-1, 112-2, ..., 112-N, and/or the peripherals 132-1, 132-2, 132-3. The networked peripherals, the remote machine manager 126, and the thin clients 122-1, 122-2, ..., 122-M may be in the same LAN 108, e.g., a wireless local area network (WLAN) or a wired LAN. In certain configurations, those devices may be in a different type of network.

Figure 2:
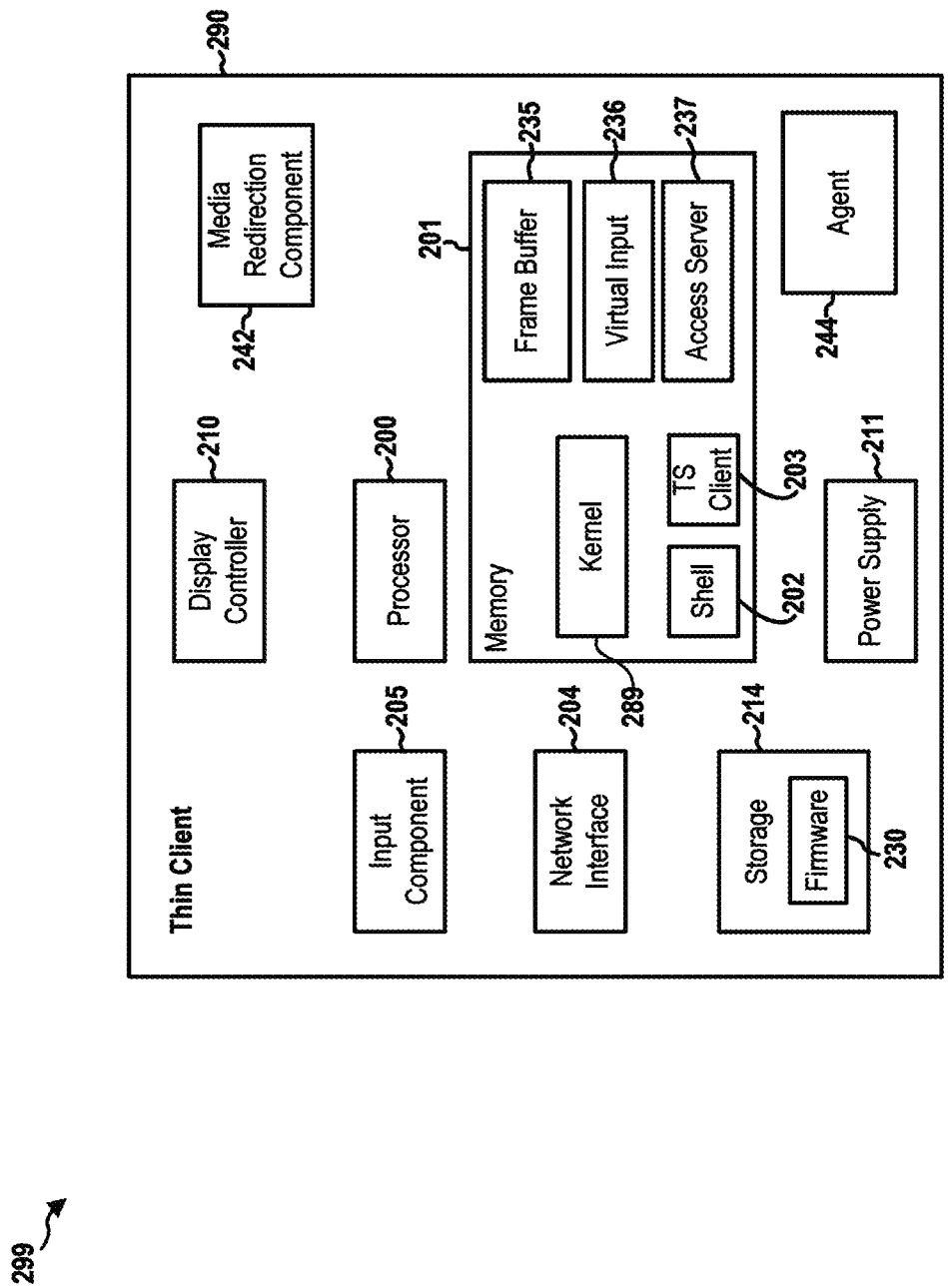
FIG. 2 is a diagram illustrating an exemplary thin client.

FIG. 2 is a diagram 299 illustrating an exemplary thin client. A thin client 290, which may be any one of the thin clients 122-1, 122-2, ..., 122-M, includes one or more processors 200, which can be microprocessors, controllers or any other suitable type of processors for processing computing executable instructions to control the operation of the device. The computer executable instructions can be provided using any computer-readable media, such as memory 201. The memory 201 is of any suitable type such as random access memory (RAM). The thin client 290 may also include a storage component 214, which may be a storage device of any type such as a magnetic or optical storage device, a hard disk drive, a CD, DVD, or other disc drive, a flash memory, an EPROM, or an EEPROM.

The thin client 290 may store firmware 230 in the storage component 214. When the processor 200 executes the firmware 230, the processor 200 loads code and data of the firmware 230 into the memory 201. This example shows that the firmware 230 provides in the memory 201, among other components, a kernel 289, a software shell 202, a terminal server (TS) client 203 application, a virtual input component 236, and an access server 237, which are described in more detail infra. Further, a particular area of the memory 201 is designated as a frame buffer 235, A network interface 204 enables the thin client 290 to communicate over a network (in particular a wireless network) with the remote machines 112-1, 112-2, ..., 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
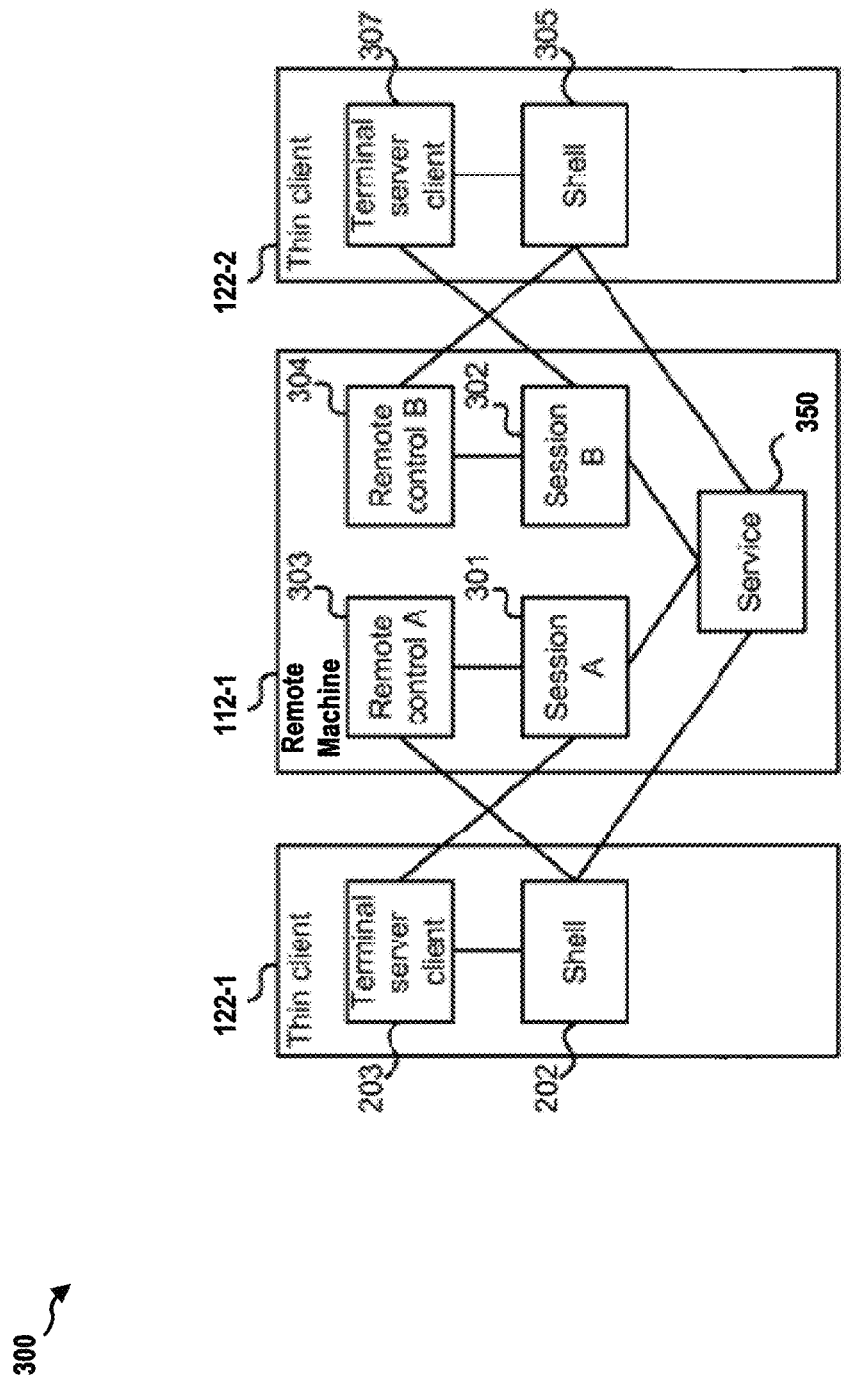
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
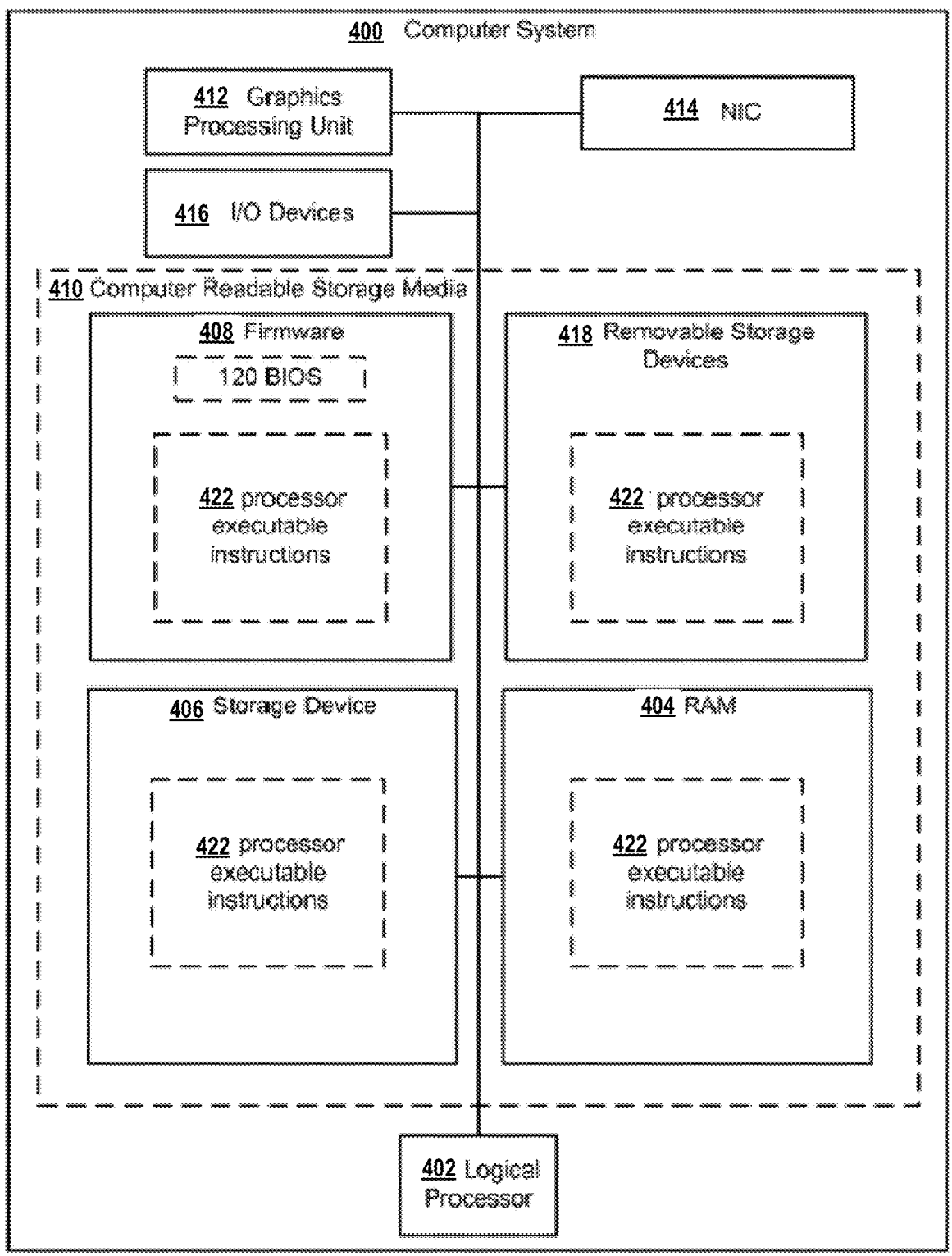
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
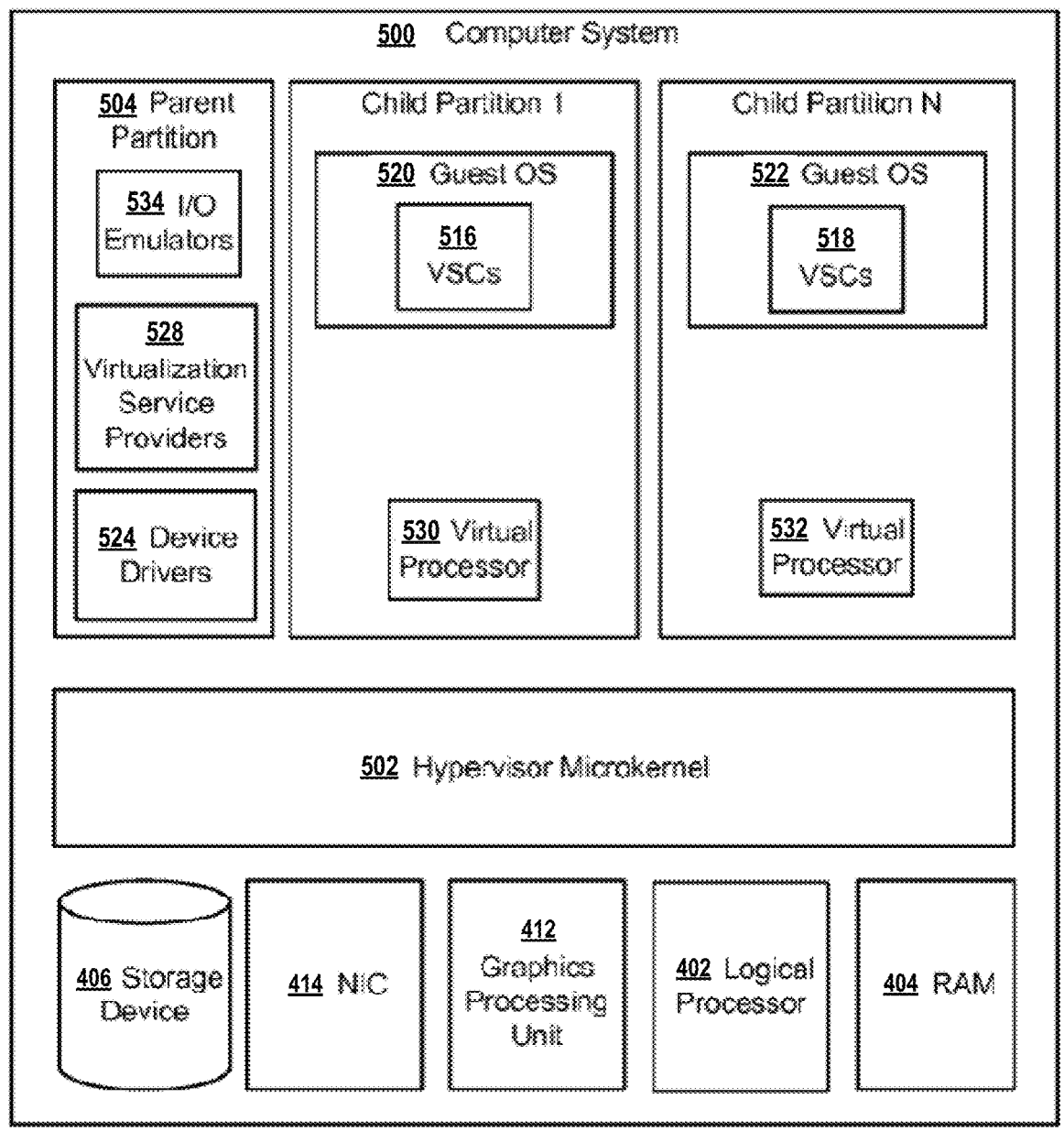
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as back-end drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT®, APPLE®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
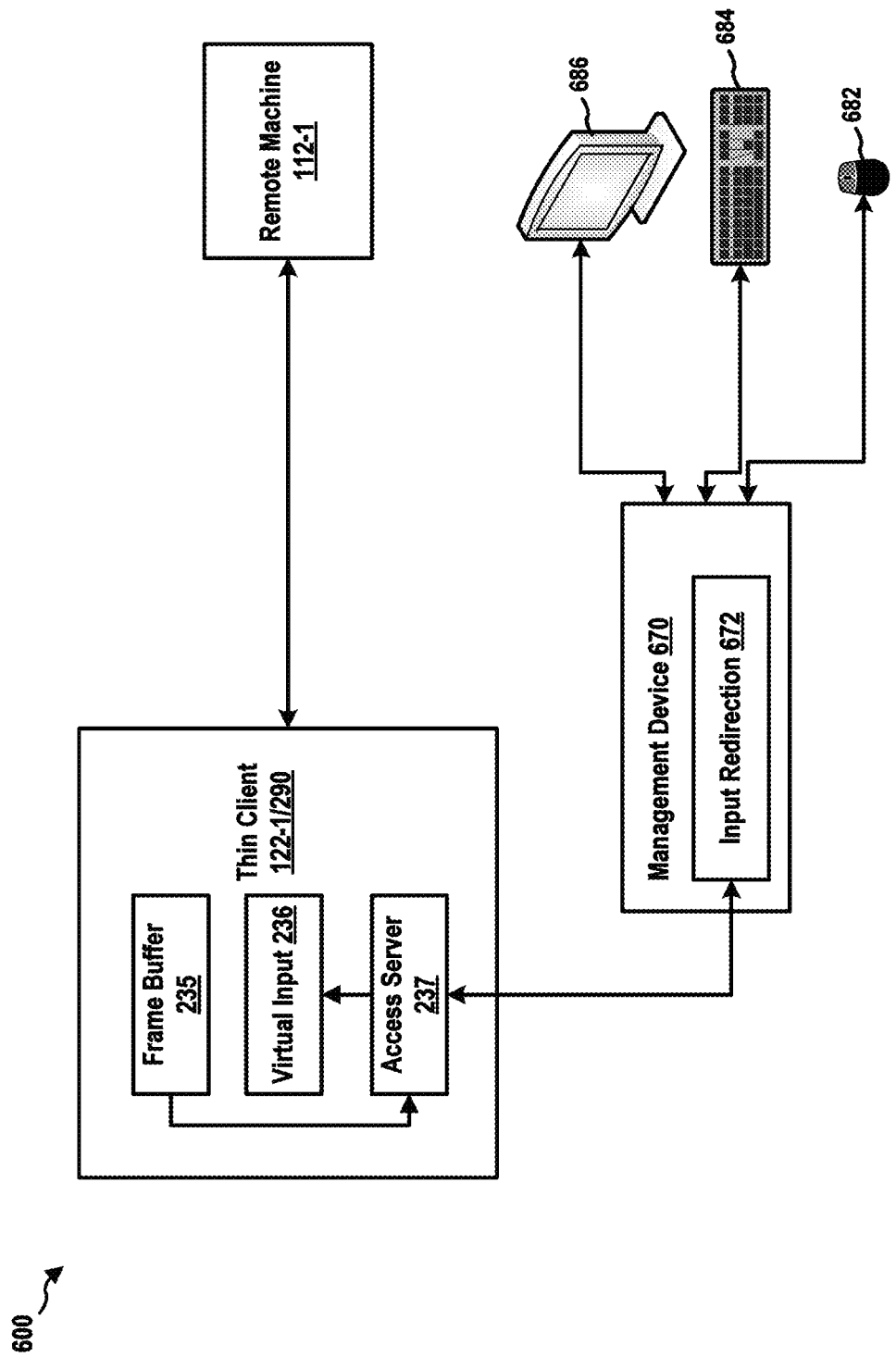
FIG. 6 is a diagram illustrating communication between a thin client, a remote machine, and a management device.

FIG. 6 is a diagram 600 illustrating communication between a thin client 122-1, a remote machine 112-1, and a management device 670. Although FIG. 6 shows the thin client 122-1/thin client 290 and the remote machine 112-1, the thin client may be any of the thin clients 122-1, 122-2, ..., 122-M and the remote machine may be any of the remote machines 112-1, 112-2, ..., 112-N. As described supra, the thin client 122-1 may allow a user to access the remote machine 112-1 over a network.

Further, in certain configurations, the access server 237 of the thin client 122-1 allows other devices to access the thin client 122-1 over a network. In this example, the management device 670 can send a login message to the access server 237 for establishing a session with the access server 237. The login message may include user credentials such as a user name and a password.

The thin client 122-1 may generate image data for an image to be displayed on a display 132-3, and may store the image data in the frame buffer 235. Subsequently, the display controller 210 may read the image data from the frame buffer 235 and may generate display signals that can drive the display 132-3 to display the image.

In certain configurations, after establishing a session with the management device 670, the access server 237 can read the image data stored in the frame buffer 235, and can send the image data to the management device 670. Upon receiving the image data, the management device 670 can display the image accordingly on a display of the management device 670. As such, the management device 670 can display the same image as the image being displayed on the display 132-3 of the thin client 122-1.

A user of the management device 670 can use a human interface device, such as a keyboard 684 and a mouse 682, to interact with the management device 670. A human interface device or HID is a type of computer device usually used by humans and takes input and gives output to humans. Further, a human interface device may be a device in the USB human interface device class (USB HID class), which is a part of the USB specification for computer peripherals. USB HID class specification specifies a device class (a type of computer hardware) for human interface devices such as keyboards, mice, game controllers and alphanumeric display devices. The USB HID class is defined in a number of documents provided by the USB Implementers Forum's Device Working Group. The primary document used to describe the USB HID class is the Device Class Definition for HID 1.11: "Device Class Definition for Human Interface Devices (HID) Firmware Specification, Jun. 27, 2001; Version 1.11," which is incorporated by reference expressively herein in its entirety.

When a user operates one or more human interface devices, the management device 670 receives input signals from the human interface devices and generates human interface device events accordingly. A human interface device event specifies an input provided by a human interface device. For example, a human interface device event can be an input-event data collection that specifies a key stroke generated from a keyboard or a mouse click at a particular pixel location on the screen.

The management device 670 includes an input redirection component 672, which can redirects human interface device events. In particular, the input redirection component 672 can generate one or more messages to carry the human interface device events generated at the management device 670. Further, the input redirection component 672 may only redirect the human interface device events generated on the redirected screen display of the thin client 122-1 that is being displayed on a display 686 of the management device 670. For example, the management device 670 may display the redirected screen display of the thin client 122-1 in a specific area (e.g., the left half) of the display 686. When a human interface device event is generated on that specific area (such as a mouse click on the redirected screen display), that human interface device event is then included in a message to be sent to the thin client 122-1. If a human interface device event is not generated on the specific area, the human interface device event is not to be redirected. In addition, the human interface device event may be modified to specify the event location (e.g., location of a mouse click) relative to the redirected screen display of the thin client 122-1, instead of being relative to the display area of the display 686. Subsequently, the input redirection component 672 sends the messages to the thin client 122-1.

At the thin client 122-1, the access server 237 receives the messages carrying the human interface device events. The access server 237 extracts the human interface device events from the messages and sends the human interface device events to the virtual input component 236. The virtual input component 236 receives the human interface device events and calls one or more functions of the kernel 289 to simulate a local human interface device event. For example, the human interface device event may specify a mouse click at location (100, 100). The virtual input component 236 may call a function of the kernel 289 with corresponding parameters such that the kernel 289 perceives that a human interface device event generated by a mouse locally connected to the thin client 122-1 (e.g., the mouse 132-2) is sent to the kernel 289. The kernel 289 may handle the human interface device event as a local human interface device event. For example, a program of the thin client 122-1 may have registered to receive such a human interface device event. The kernel 289 then sends the human interface device event to the program.

In one scenario, after the management device 670 logged on to the access server 237 (e.g., under the control of a user), the access server 237 may generate an interface showing a list of operations that can be executed. In particular, when the thin client 122-1 encounters a runtime error, the interface may present debugging information as well as debugging and/or remedial action options. This interface is re-directed by the access server 237 to the management device 670 and is displayed on the display 686. The user may, for example, use the mouse 682 to click a button on the interface to select an operation. The management device 670 in response generates a human interface device event specifying a mouse click on a particular location (of the button). The input redirection component 672 sends a message containing the human interface device event to the access server 237 of the thin client 122-1. The access server 237, upon receiving the message, extracts the human interface device event and sends the human interface device event to the virtual input component 236. The virtual input component 236 accordingly calls functions of the kernel 289 to simulate a local human interface device event of a mouse click at the particular location of the screen display of the thin client 122-1. The interface on the thin client 122-1 has registered with the kernel 289 to receive such human interface device events (e.g., mouse click events). Therefore, the kernel 289 sends the human interface device event to the interface. In this example, the interface then determines the debugging actions (e.g., to kill a particular process that has generated the error) selected by the user based on the location of mouse click. The interface then can inform a debugging program of the thin client 122-1 to execute such debugging actions.

Figure 7:
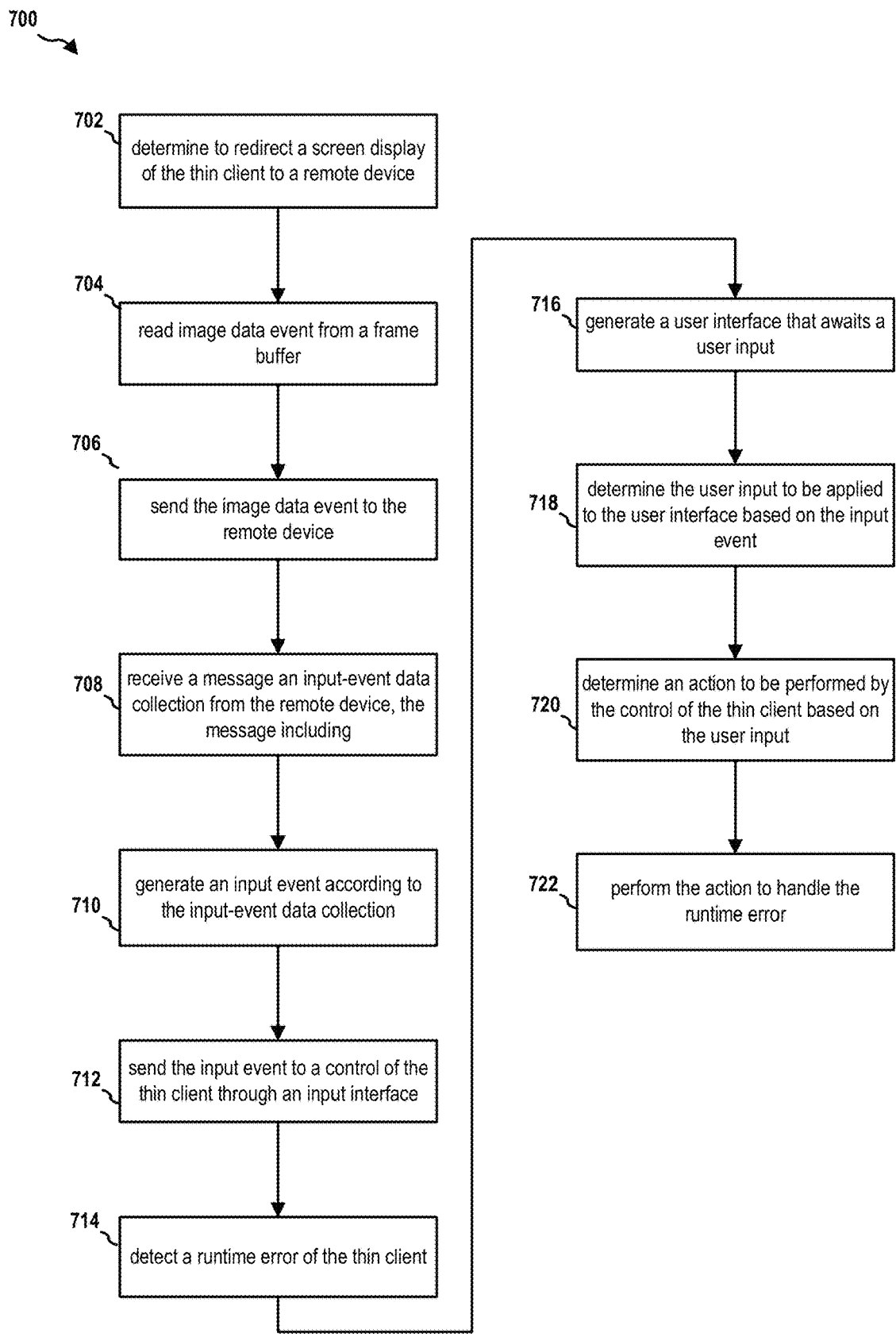
FIG. 7 is a flow chart of a method (process) for providing human interface device events.

FIG. 7 is a flow chart 700 of a method (process) for receiving human interface device events. The method may be performed by a thin client (e.g., the thin client 122-1 and the apparatus 290/290'). At operation 702, the thin client determines to redirect a screen display (e.g., an image on the display 132-3) of the thin client to a remote device (e.g., the management device 670). At operation 704, the thin client reads image data event from a frame buffer. At operation 706, the thin client sends the image data event to the remote device, for example, over a network.

At operation 708, the thin client receives a message from the remote device, the message including an input-event data collection. At operation 710, the thin client generates an input event according to the input-event data collection. At operation 712, the thin client sends the input event to a control (e.g., the kernel 289) of the thin client through an input interface. In certain configurations, the input event is a human interface device event. In certain configurations, the human interface device event includes at least one of a keyboard event and a mouse event. In certain configurations, the input interface is a virtual input interface (e.g., the virtual input component 236).

At operation 714, the thin client detects a runtime error of the thin client. At operation 716, the thin client generates a user interface that awaits a user input. The user interface is displayed in the screen display. At operation 718, the thin client determines the user input to be applied to the user interface based on the input event. At operation 720, the thin client determines an action to be performed by the control of the thin client based on the user input. In certain configurations, the user interface is generated to present debugging information of the runtime error and to receive the user input to handle the runtime error. At operation 722, the thin client performs the action to handle the runtime error.

Figure 8:
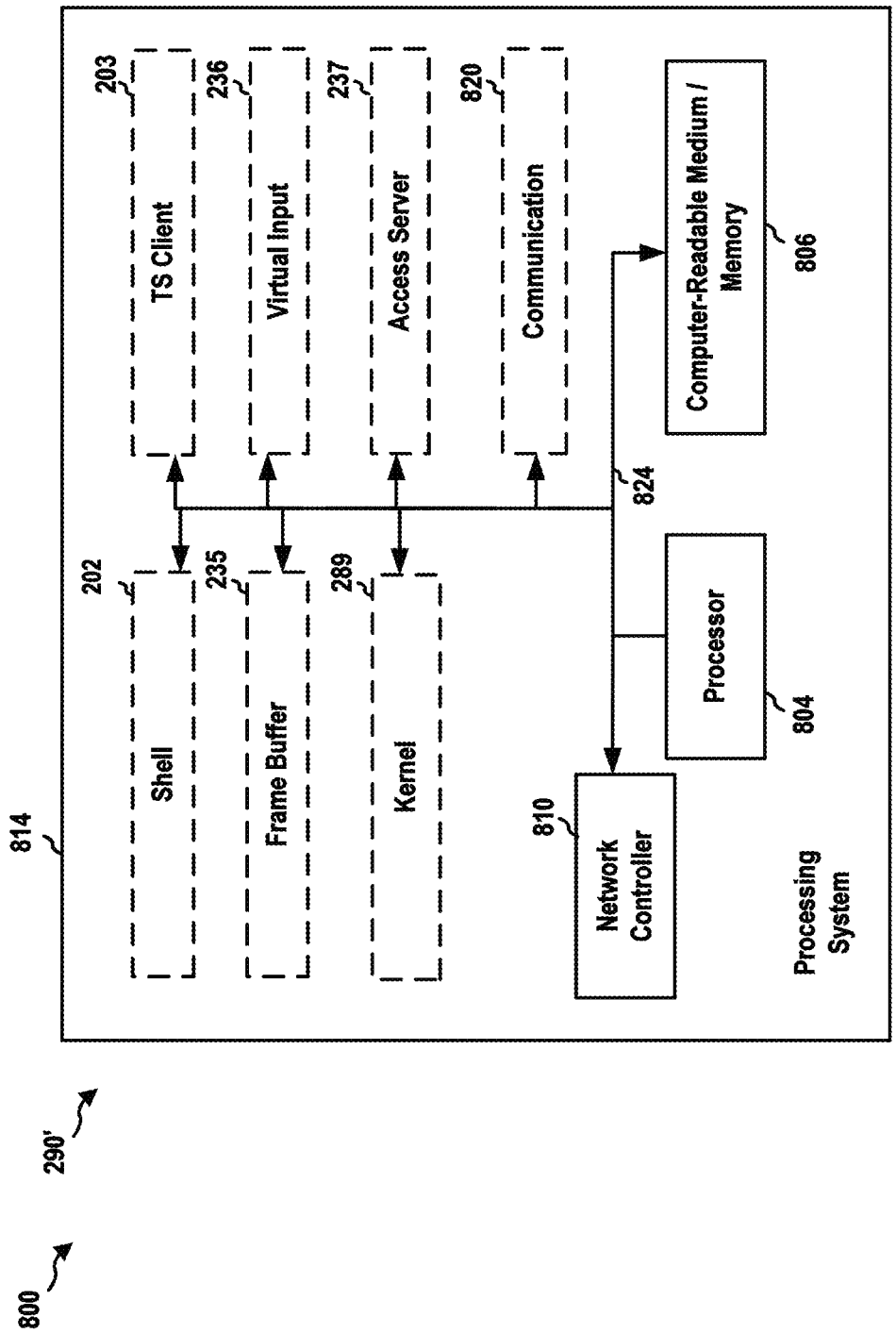
FIG. 8 is a diagram illustrating an example of a hardware implementation for an apparatus employing a processing system.

FIG. 8 is a diagram 800 illustrating an example of a hardware implementation for an apparatus 290' (e.g., the thin client 290) employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, including the processor 804 the computer-readable medium/memory 806, and the network controller 810. In particular, the computer-readable medium/memory 806 may include the memory 201 and the storage component 214. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 820. In addition, the network controller 810 receives information from the processing system 814, specifically the communication component 820, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the frame buffer 235, the kernel 289, the virtual input component 236, and the access server 237. The components may be software components running in the processor 804, resident/stored in the computer readable medium/memory 806, one or more hardware components coupled to the processor 804, or some combination thereof.

The apparatus 290' may be configured to include means for performing each of the operations described supra referring to FIG. 7. The aforementioned means may be one or more of the aforementioned components of the apparatus 290 and/or the processing system 814 of the apparatus 290' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   redirecting a screen display of the thin client to a remote device;
   receiving a message from the remote device, the message including an input-event data collection;
   generating an input event according to the input-event data collection;
   sending the input event to a control of the thin client through an input interface;
   generating a user interface that awaits a user input, wherein the user interface is displayed in the screen display;
   determining the user input to be applied to the user interface based on the input event;
   determining an action to be performed by the control of the thin client based on the user input;
   detecting a runtime error of the thin client, wherein the user interface is generated to present debugging information of the runtime error and to receive the user input to handle the runtime error; and
   performing the action to handle the runtime error.

2. The method of claim 1, wherein the input event is a human interface device event.

3. The method of claim 2, wherein the human interface device event includes at least one of a keyboard event and a mouse event.

4. The method of claim 1, wherein the input interface is a virtual input interface.

5. The method of claim 1, wherein the redirecting includes:
   reading image data event from a frame buffer; and
   sending the image data event to the remote device.

6. An apparatus, the apparatus being a thin client, comprising:
   a memory; and
   at least one processor coupled to the memory and configured to:
   redirect a screen display of the thin client to a remote device;
   receive a message from the remote device, the message including an input-event data collection;
   generate an input event according to the input-event data collection;
   send the input event to a control of the thin client through an input interface;
   generate a user interface that awaits a user input, wherein the user interface is displayed in the screen display;
   determine the user input to be applied to the user interface based on the input event; and
   determine an action to be performed by the control of the thin client based on the user input;
   detect a runtime error of the thin client, wherein the user interface is generated to present debugging information of the runtime error and to receive the user input to handle the runtime error; and
   perform the action to handle the runtime error.

7. The apparatus of claim 6, wherein the input event is a human interface device event.

8. The apparatus of claim 7, wherein the human interface device event includes at least one of a keyboard event and a mouse event.

9. The apparatus of claim 6, wherein the input interface is a virtual input interface.

10. The apparatus of claim 6, wherein to redirect the screen display, the at least one processor is further configured to:
    read image data event from a frame buffer; and
    send the image data event to the remote device.

11. A non-transitory computer-readable medium storing computer executable code for operating a thin client, comprising code to:

redirect a screen display of the thin client to a remote device;

receive a message from the remote device, the message including an input-event data collection;

generate an input event according to the input-event data collection;

send the input event to a control of the thin client through an input interface;

generate a user interface that awaits a user input, wherein the user interface is displayed in the screen display;

determine the user input to be applied to the user interface based on the input event; and determine an action to be performed by the control of the thin client based on the user input;

detect a runtime error of the thin client, wherein the user interface is generated to present debugging information of the runtime error and to receive the user input to handle the runtime error; and perform the action to handle the runtime error.

12. The non-transitory computer-readable medium of claim 11, wherein the input event is a human interface device event.

13. The non-transitory computer-readable medium of claim 12, wherein the human interface device event includes at least one of a keyboard event and a mouse event.

14. The non-transitory computer-readable medium of claim 11, wherein the input interface is a virtual input interface.

15. The non-transitory computer-readable medium of claim 11, wherein to redirect the screen display, the code is further configured to:

read image data event from a frame buffer; and send the image data event to the remote device.

* * * * *